United States Patent [19]

Kluting et al.

[11] 4,295,682

[45] Oct. 20, 1981

[54] SUPERFINE TOOTH SEAT BACK ADJUSTER

[75] Inventors: Bernd A. Kluting, Radevormwald, Fed. Rep. of Germany; Vikram H. Zaverni, Springfield, Mich.

[73] Assignee: Keiper U.S.A., Inc., Battle Creek, Mich.

[21] Appl. No.: 90,343

[22] Filed: Nov. 1, 1979

[51] Int. Cl.³ ............................................. A47C 1/026
[52] U.S. Cl. .................................... 297/367; 16/144; 16/146; 297/364; 297/366; 297/379
[58] Field of Search ................................ 297/366-371; 16/139, 144, 146

[56] References Cited

U.S. PATENT DOCUMENTS

| | | | |
|---|---|---|---|
| 3,479,088 | 11/1969 | Bonnand | 297/366 X |
| 4,165,128 | 8/1979 | Strowick et al. | 297/367 |
| 4,218,092 | 8/1980 | Schach et al. | 297/367 |

FOREIGN PATENT DOCUMENTS

| | | | |
|---|---|---|---|
| 2019707 | 11/1971 | Fed. Rep. of Germany | 297/366 |
| 1414700 | 9/1965 | France | 297/366 |

*Primary Examiner*—William E. Lyddane

[57] ABSTRACT

A vehicle seat back adjuster for achieving fine increments of adjustment in the order of 1°, without resort to translation overdrive, through employment of reaction backup for teeth in the order of 1° pitch in an adjustment quadrant minimizing yield of components which could permit fine tooth disengagement.

25 Claims, 15 Drawing Figures

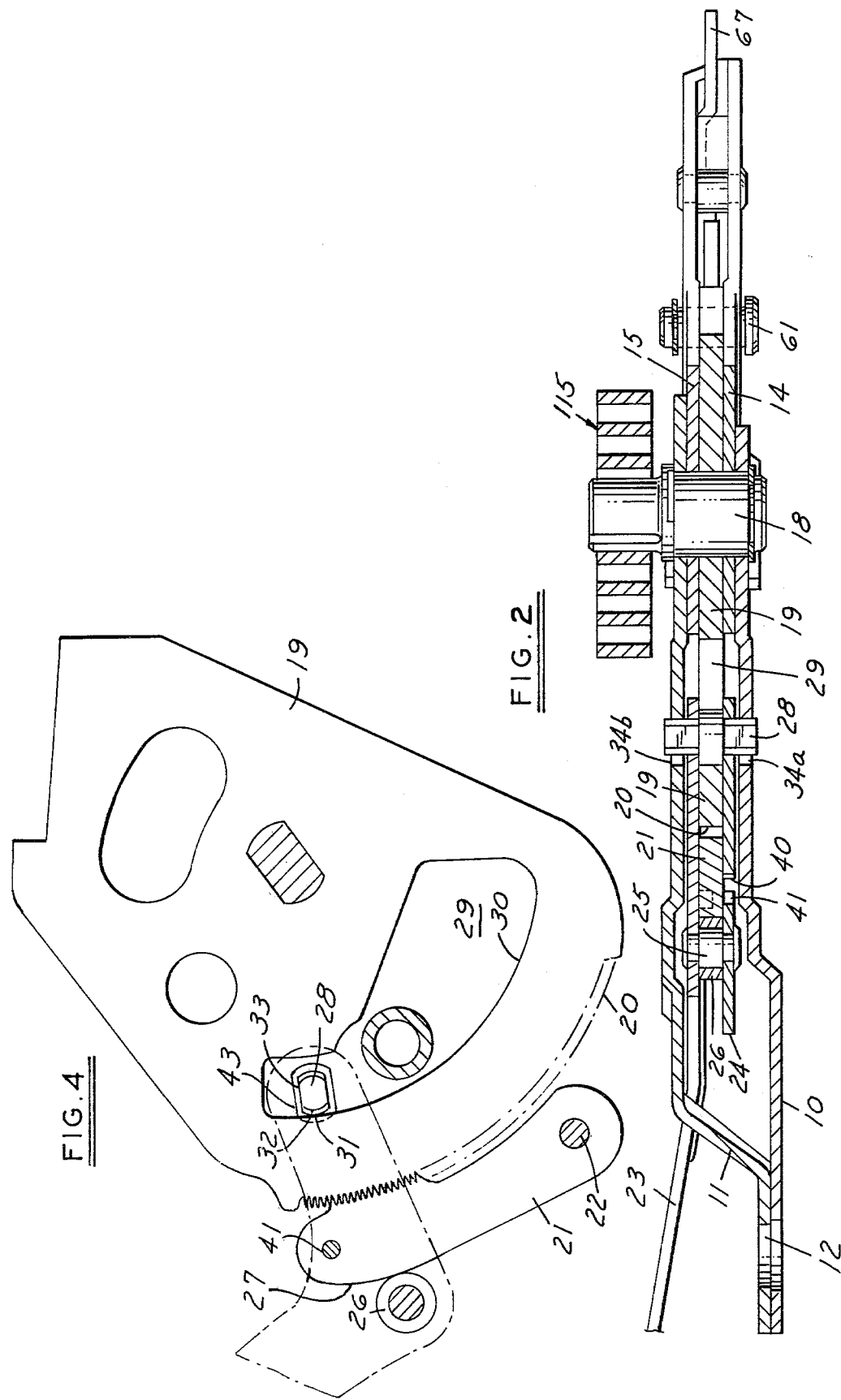

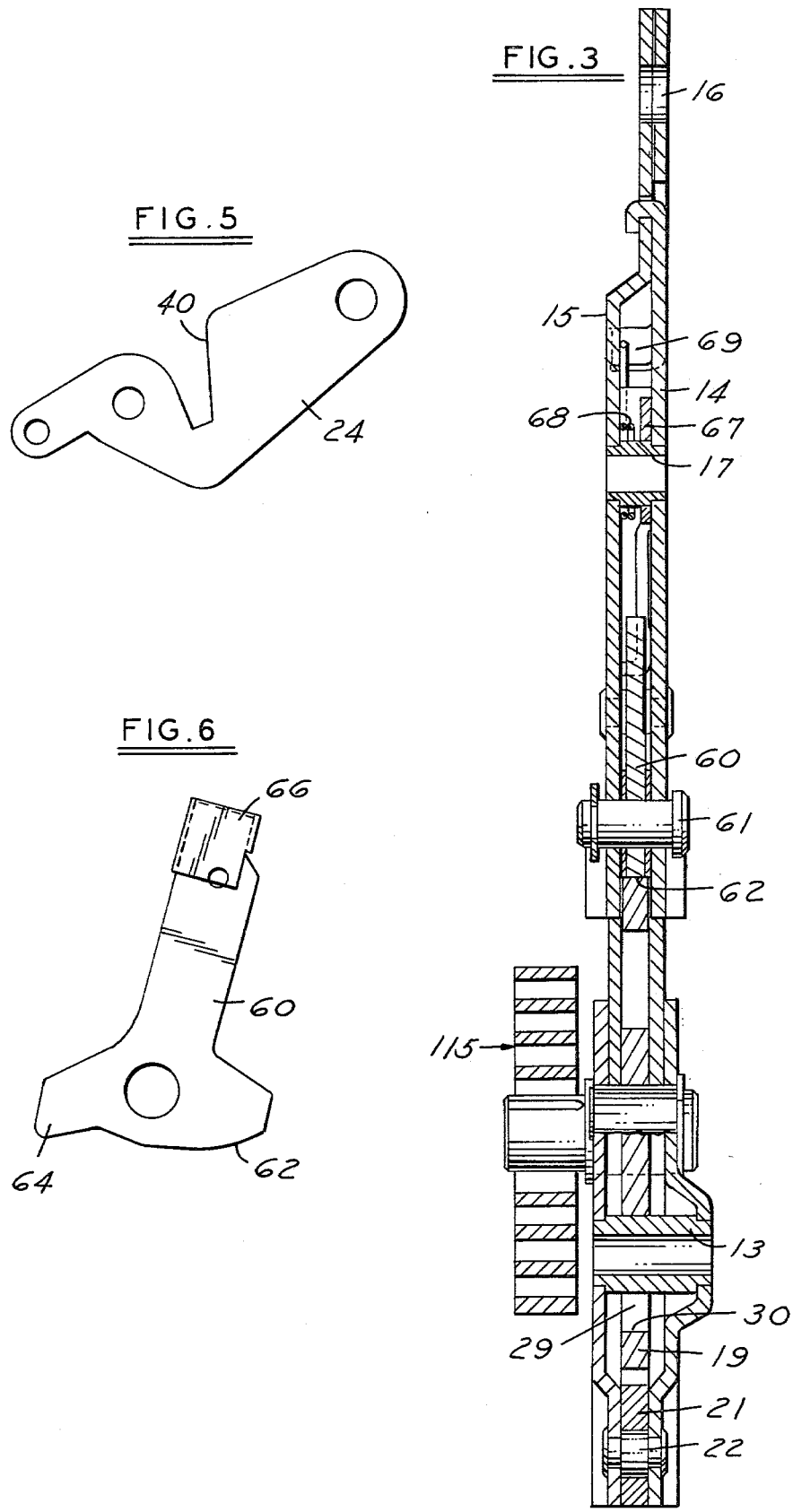

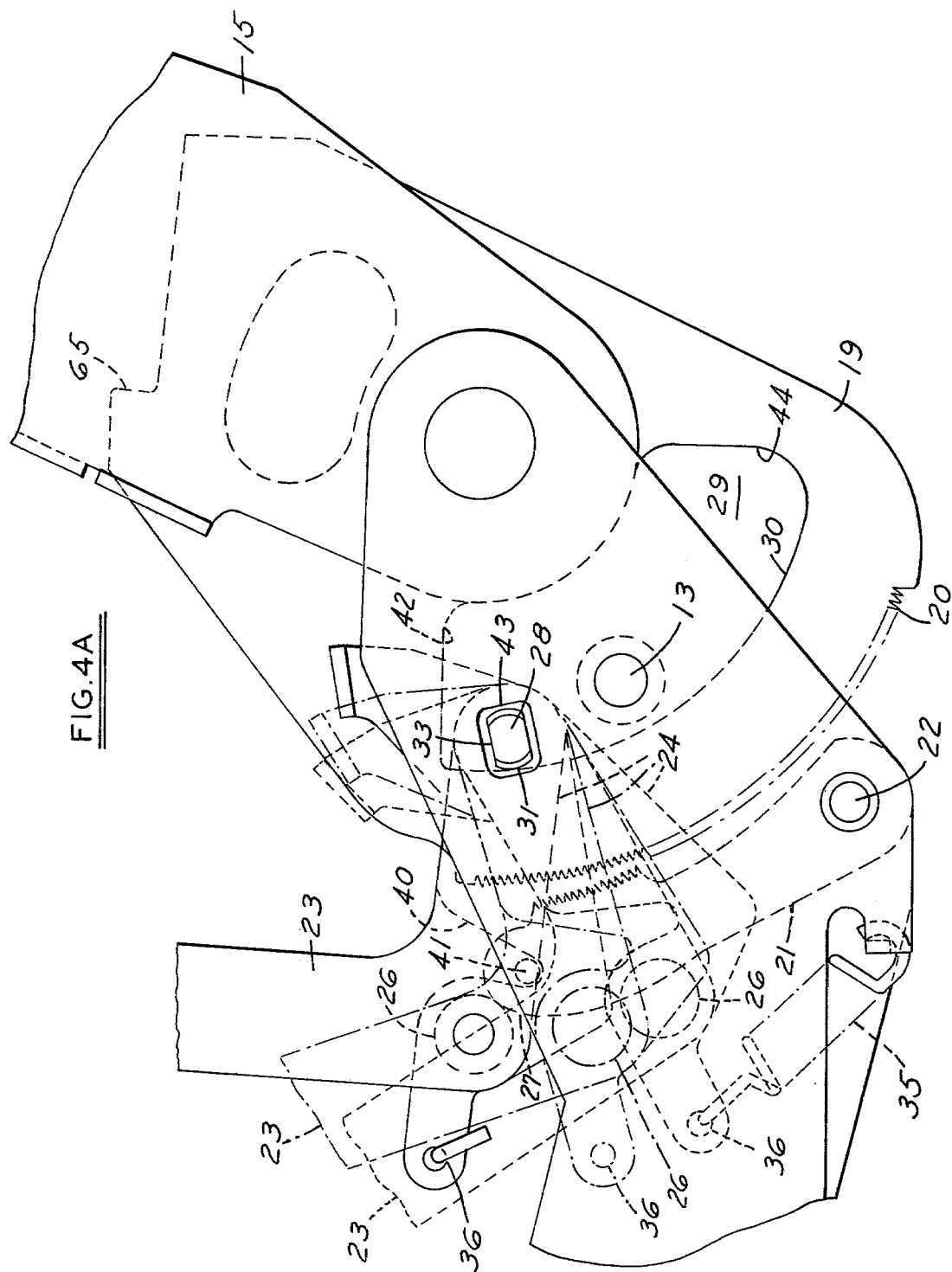

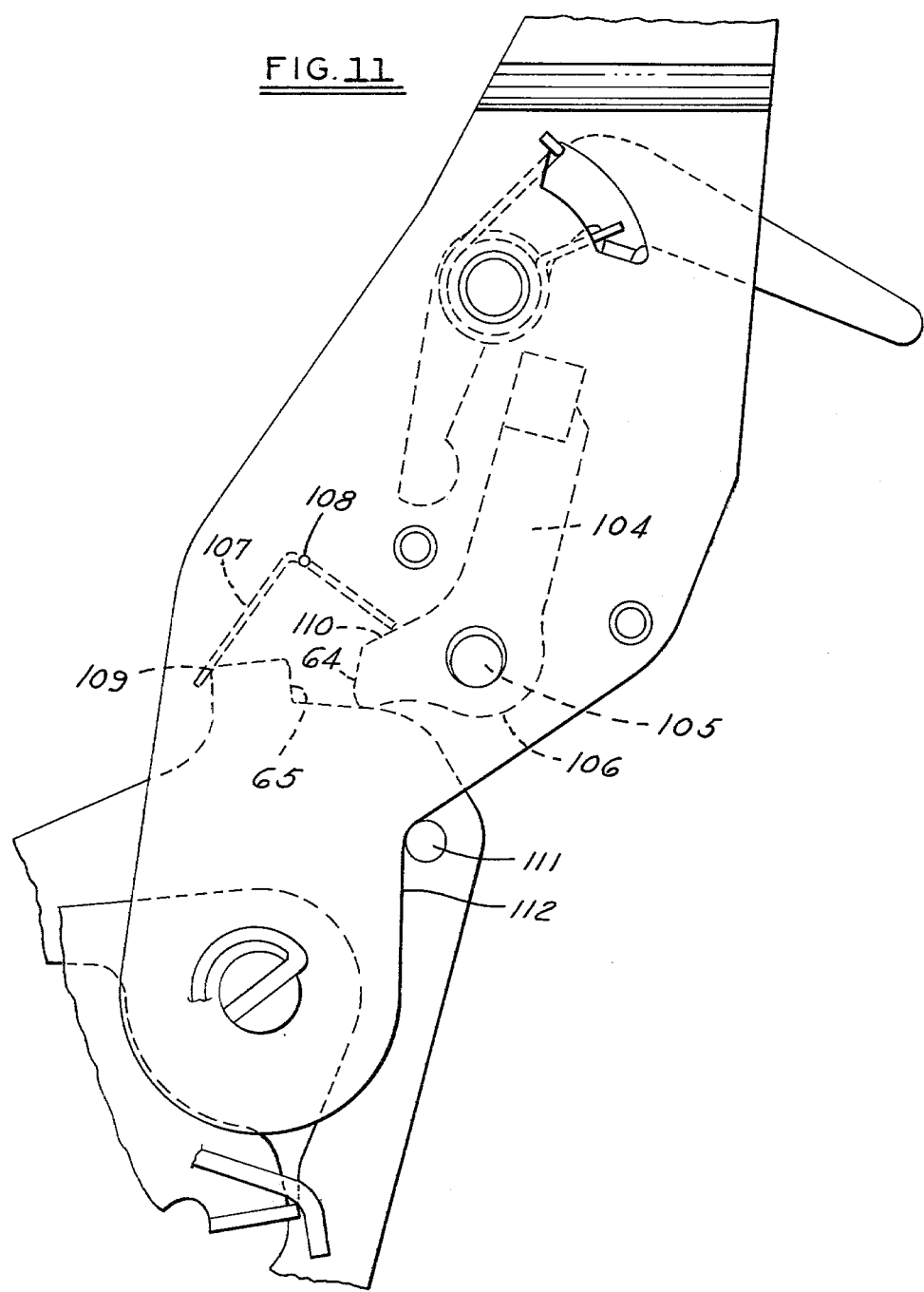

SUPERFINE TOOTH SEAT BACK ADJUSTER

BACKGROUND OF THE INVENTION

In copending application Ser. No. 945,303 filed on Sept. 25, 1978 applicant found it possible through the use of a pivoted locking plate coaxial with the main hinge pivot, capable of angular movement relative to both seat and back rest hinge members, together with a ratchet having an arcuate toothed sector pivotally connected to the seat hinge member and with a differential translation connection between locking plate and ratchet plate, together with the provision of an inertia latch pivotally connected to the back rest hinge member interacting with the locking plate, to achieve desired operation, under presence or absence of deceleration, including the combined advantages of fine small increment adjustment over a full range of seat recliner accommodation together with automatic release for forward tilting to facilitate rear seat passenger convenience in entering and leaving the vehicle. In a further copending application Ser. No. 072,013 filed on Sept. 4, 1979, applicant discloses a seat back adjuster which employs a combination of improved accuracy in stop location for extremity of adjustment together with a special provision at each end of the ratchet sector which cooperates with the pawl extremities to prevent the misengagement which could otherwise result from overpassing the last incremental position at which full tooth engagement can be achieved. Such provision, in case of overtravel beyond the last increment for full tooth engagement, assured positive back travel to the last increment position in response to pawl engagement. Such provision together with a translation overdrive linkage between the seat back and adjustment ratchet achieves a substantial improvement in fineness of adjustment to approximately one degree of increments of seat back adjustment.

SUMMARY OF THE PRESENT INVENTION

Applicant has now found it possible to achieve equally fine adjustment in the order of one degree of back rest movement without resort to extra translation linkage of his prior applications by using a toothed quadrant having a one-to-one angular dispacement of adjustment with the seat back and a one degree tooth pitch. A matching tooth pivoted pawl is held in engagement by a handle link adapted to apply engagement actuating pressure on one side of the pawl and reaction engagement pressure on an opposed reaction surface provided in the toothed quadrant whereby tolerances and deflection of component parts under load which had previously limited the fineness of tooth pitch have been substantially minimized and virtually eliminated. A number of optional configurations for the linkage have been devised all of which directly confine the tooth engaging elements against disengagement with a minimum of deflection potential.

BRIEF DESCRIPTION OF THE DRAWINGS

FIG. 2 is a sectional view taken along the line 2—2 of FIG. 1;

FIG. 3 is a sectional view taken along the line 3—3 of FIG. 1;

FIG. 4 is an enlarged side elevation of the quadrant, pawl and handle shown in FIG. 1 with other elements omitted for clarity;

FIG. 4A is a further enlarged side elevation of the elements of FIG. 4 illustrating range of operation under tolerance extremities;

FIG. 5 is a side elevation of the pawl drive out lever illustrated in FIG. 1;

FIG. 6 is a side elevation of the inertia cam illustrated in FIG. 1;

FIG. 11 is a fragmentary side elevation of the seat back adjuster with a modified form of inertia latch.

With reference to FIGS. 1, 2 and 3 the preferred embodiment of the seat back adjuster includes an inner lower bracket 10 and an outer lower bracket 11, adapted for attachment to the front seat cushions of the vehicle by suitable bolts passing through holes 12 and a spacer bushing 13. An inner upper bracket 14 and outer upper bracket 15, adapted for attachment to the forward seat back of a two-door passenger car by suitable bolts through holes 16 and upper bracket bushings 17, are pivotally connected to the lower brackets by an adjuster pivot 18. Also pivotally connected relative to both upper and lower brackets by the adjuster pivot 18 a central quadrant 19 having a toothed sector 20 is adapted for engagement by a toothed pawl 21 pivotally connected by a pawl rivet 22 between the lower brackets in central alignment for engagement with the toothed sector of the quadrant.

Figure 1:
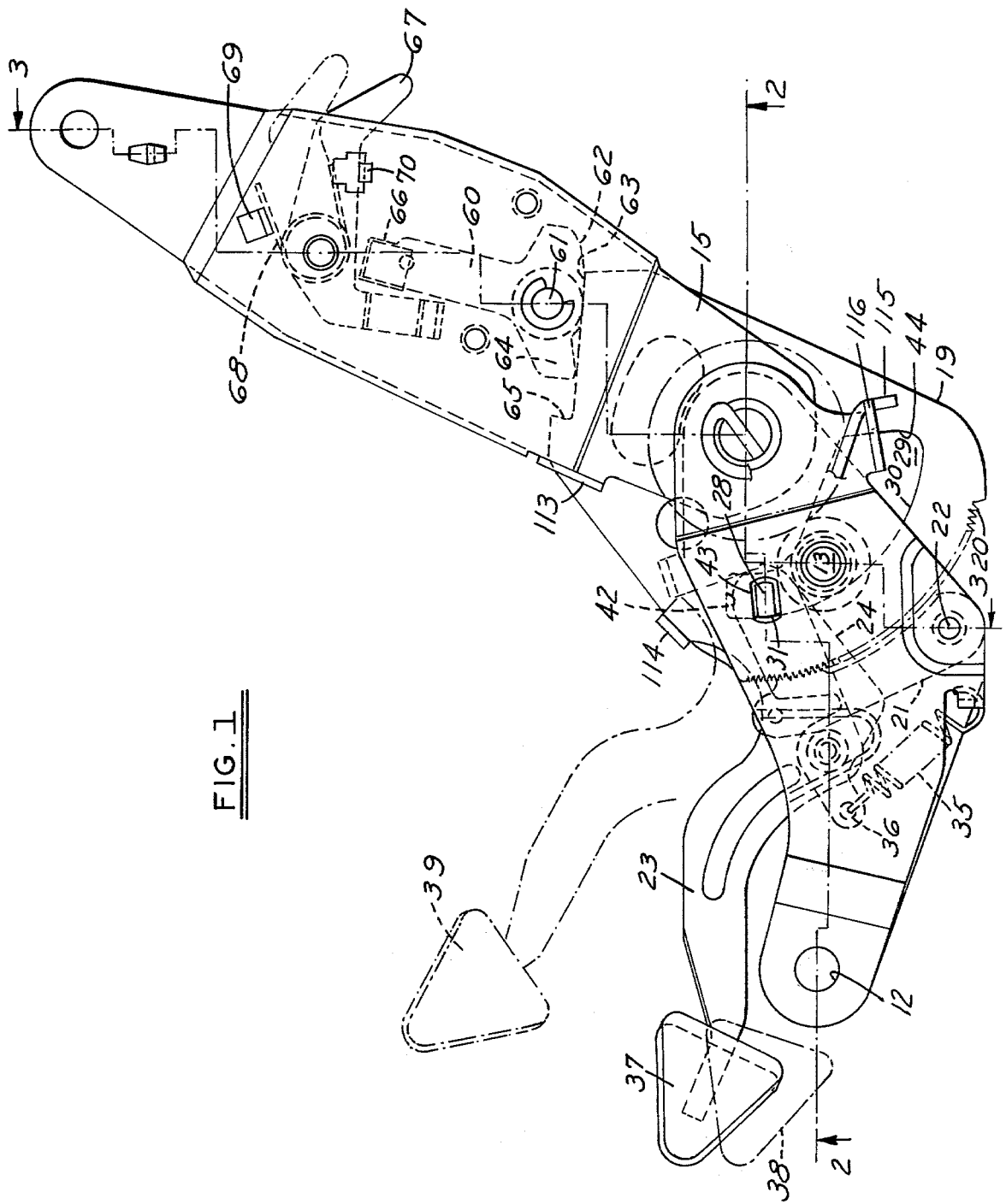
FIG. 1 is a side elevation of the seat back adjuster assembly constructed in accordance with the present invention.

Between the lower brackets and on either side of the pawl and quadrant a hand lever 23 and pawl drive out lever 24 are connected by an actuator shouldered rivet 25 on which an actuator bushing roller 26 is retained for engagement with the cam surface 27 (see FIG. 4) at the back of the pawl 21. The hand and pawl drive out levers are also connected by a slide pin 28 which extends within an opening 29 having an arcuate surface 30 with a radius centered on the adjuster pivot 18. The slide pin 28 has a central boss with a radius 31 matching the arcuate surface 30 and central cylindrical pin extensions 32 for pivotally engaging circular holes in the hand and pawl drive out levers. The pin extensions have flats 33 engaging matching slots 34a and 34b in the respective inner and outer lower brackets 10 and 11 which serve to retain the slide with the matching surfaces 30 and 31 in alignment and to provide a general pivot location for the hand and pawl drive out levers while permitting locking displacement of such levers and the slide pin pivotally connected thereto to provide a reaction element for the toothed sector 20 when the hand lever is actuated in a counterclockwise direction to provide tightening engagement of the actuating bushing roller 26 with the cam surface 27 at the back of the pawl. The angle of the cam surface 27 is such as to provide self-locking action throughout the operative range as hereafter more specifically described. A tension spring 35 anchored to the outer lower bracket and engaging an extension 36 of the pawl drive out lever normally retains the hand lever, shown in full line 37 at midrange of tolerances, and actuator roller 26 in locking engagement with the pawl and with the maximum full release range of approximately 36½° as indicated between the phantom positions 38 and 39 of the hand lever. Release of the pawl is assured by engagement of a drive out surface 40 in the pawl drive out lever with a stamped projection 41 at the outer end of the pawl.

Limits of adjustment are established at approximately 8° forward, from the position shown by engagement of the end 42 of the slotted opening 29 in the quadrant 19 with the adjacent surface 43 of the slide pin 28, and a 50° rearward adjustment by engagement of the outer extremity surface 44 of the slotted opening 29 with the lower bracket bushing 13.

With reference to FIG. 4A the tolerances and geometry of pawl engagement are illustrated in detail with critical dimensions for a typical embodiment specified in millimeters. It will be seen that the offset for the radius of the pawl back and the hand lever roller path provide a converging path of approximately 6° sufficient to establish a self-locking angle and that tolerance extremities provide an engagement range well within the extremities of the circular arc at the back of the pawl. It will also be noted that the ramp angle for the hand lever roller engagement at the extremity of opening is such as to provide a rapid displacement of the pawl for effecting tooth engagement after adjustment has taken place during initial travel of the hand lever toward locking engagement of the pawl. The pawl is provided with fifteen teeth with the pitch line of the center tooth lying at the apex of a right angle extending between pawl and quadrant pivots. This relationship together with a 40° preferred tooth form results in a relatively light loading of the roller from any tooth separating forces incident to passenger forces on the seat back.

From the foregoing description it will be apparent that any separating loads are resisted by tensile loads in the relatively short links formed by hand lever 23 and pawl drive out lever 24 extending on either side of the quadrant sector 20 and pawl 21 and connected by the respective actuator rivet 25 and slide pin extensions 32. The direct clamping of the teeth through such linkage permits a finer tooth pitch to be employed without risk of disengagement under load arising from tolerance variations and deflection of the connecting parts such as employed in previous constructions. Thus, it is possible to obtain fine adjustment incident to 1° tooth spacing without resort to the more complicated translation linkage of the aforementioned prior art constructions.

Referring again to FIGS. 1–3 the quadrant 19 and upper brackets 14 and 15 are provided with an inertia latch comprising an inertia cam 60 pivotally connected by a cam pivot 61 between the upper brackets and having a center of gravity relative to such pivot normally urging a clockwise rotation as seen in FIG. 1 limited by the engagement of cam surface 62 with a stop surface 63 at the top of the quadrant 19. With the vehicle at rest forward tilting of the seat back permits gravity to cause the cam to rotate so that the forward latch projection 64 rises to bypass the latch shoulder 65 which is adapted to block forward tilting of the seat back under sudden deceleration of the vehicle from an accident which would otherwise throw the rear passsenger against the seat back, inertia operating at the center of gravity overcoming the normally prevailing gravitational force to bias the cam in a counterclockwise direction. A plastic cap 66 at the upper end of the inertia cam centers the cam and provides a low friction surface for assuring free pivotal movement under the influence of gravity and inertia. A latch release lever 67 pivotally mounted on the upper bracket bushing 17 is biased by coil spring 68 reacting on tab 69 to an inoperative position limited by a stop 70 and can be manually actuated to release the seat back for forward tilting under any condition where the gravity actuation of the inertia latch might be inoperative.

When the seat back is moved fully forward the projection 113 on the seat back bracket engages a stop projection 114 on the handle serving not only to limit the forward movement of the seat back but also to prevent handle release movement while the seat back is tilted to such forward position. Otherwise, release of the quadrant teeth with the seat tilted forward would permit the heavy return spring 115 coiled under preload to react between a lower seat bracket extension 116 and the pivot pin 18 keyed to the upper seat back brackets 14 and 15 to suddenly accelerate the quadrant 19, without the resisting load of the seat back, to the extremity of travel established by engaging stop surfaces 42 and 43. The resulting impact could be sufficient to not only create a startling loud noise but under reptitious testing actually deform the stop surfaces and interfere with their accuracy relative to the last full tooth engagement of the pawl with the toothed sector which is particularly critical in the case of the fine tooth pitch of the present embodiment.

With reference to FIG. 11 a modification of the inertia latch provides greater clearance for the seat back bracket in the area of the cam surface 62 of the FIG. 1 embodiment extending from the inertia cam 60 serving as a stop for the seat back upon engagement with the stop surface 63 at the top of the quadrant 19. In the modification of FIG. 11 the inertia cam 104 pivoted at 105 is formed at 106 with the extension 62 eliminated and a light leaf spring 107 pivotally mounted at 108 on the upper seat bracket engages a quadrant projection at 109 and contacts the inertia cam at 110 to normally retain engagement of the latch projection 64a in potential engagement relation with the latch shoulder 65a until the seat back is manually moved forward releasing the leaf spring engagement with the projection 109 and permitting gravity to move the cam in a direction as in the case of the first embodiment. In this case a stop pin 111 projects from the quadrant for engagement with a recessed surface 112 in the upper seat back bracket to limit the rearward movement of the seat back relative to the quadrant.

ALTERNATE CONSTRUCTIONS FOR CLAMPING PAWL

Figure 7:
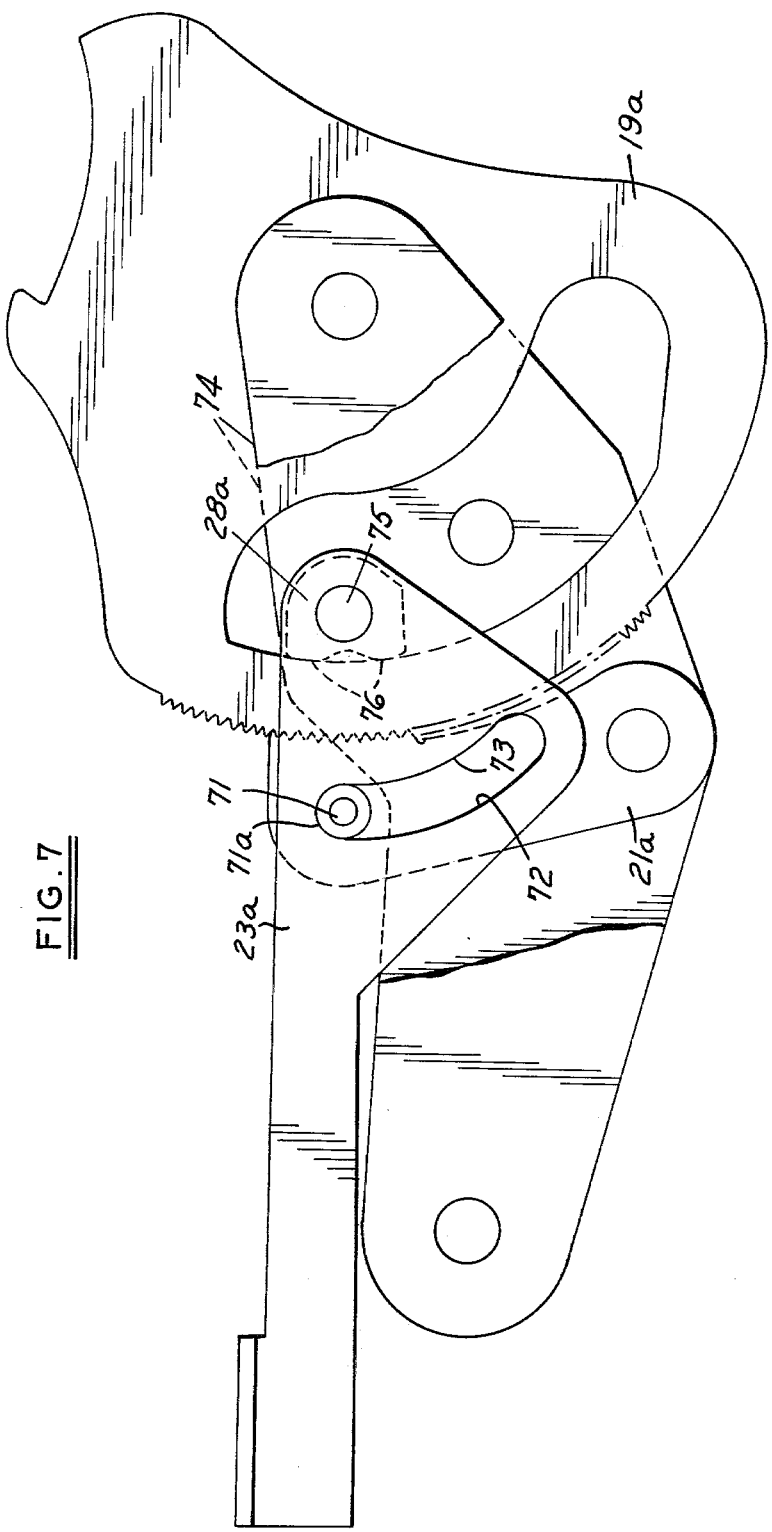
FIGS. 7–10 are alternative modifications of the linkage employed to produce and back up pawl and sector tooth engagement.

A number of modifications are possible to achieve the clamping action which accommodates the extremely fine tooth pitch providing one degree increments of adjustment with direct one-to-one ratio of tooth sector pivotal movement. With reference to FIG. 7 the toothed pawl 21a in this case is actuated by a pin 71 extending from the pawl with roller 71a engaging cam slot surfaces 72, 73 in the handle 23a to clamp and unclamp the toothed sector 74 relative to a reaction slide 28a pivotally connected to the handle by pin 75 and having surfaces 76 adapted to exert increasing clamping pressure on the sector 74 with any relative deflection.

Figure 8:
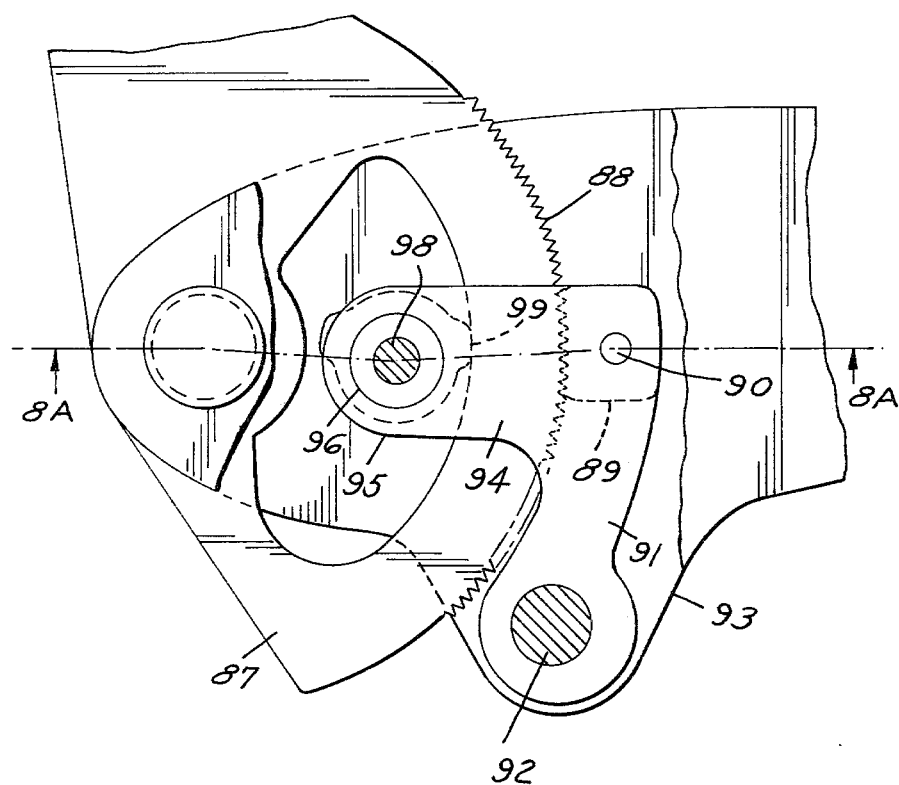
Figure 8A:
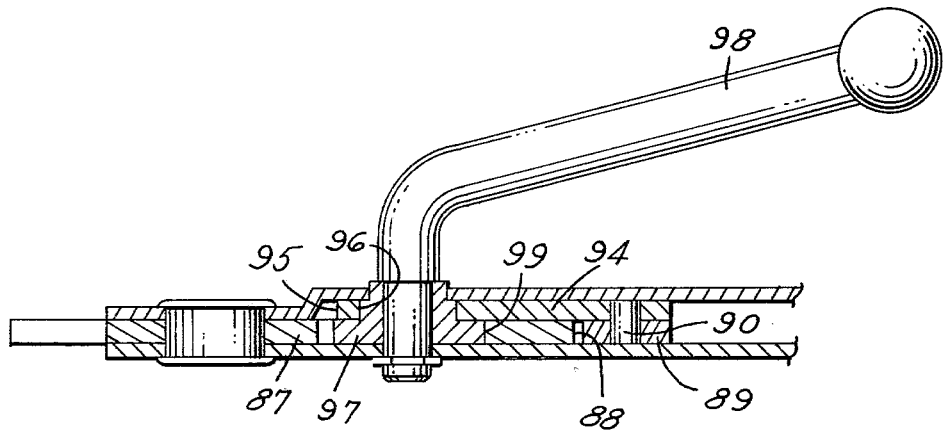

With reference to FIGS. 8 and 8A an adjustment quadrant 87 having a toothed sector 88 is retained by a toothed shoe 89 pivotally connected at 90 to a pawl 91 in turn pivotally connected at 92 to a lower seat bracket 93 with pawl extension 94 meeting at a pivotal center 95 apertured at 96 to receive a pivotal cam 97 actuated by handle 98 to produce a locking action of cam lobe 99 to clamp the toothed sector 88.

Figure 9:
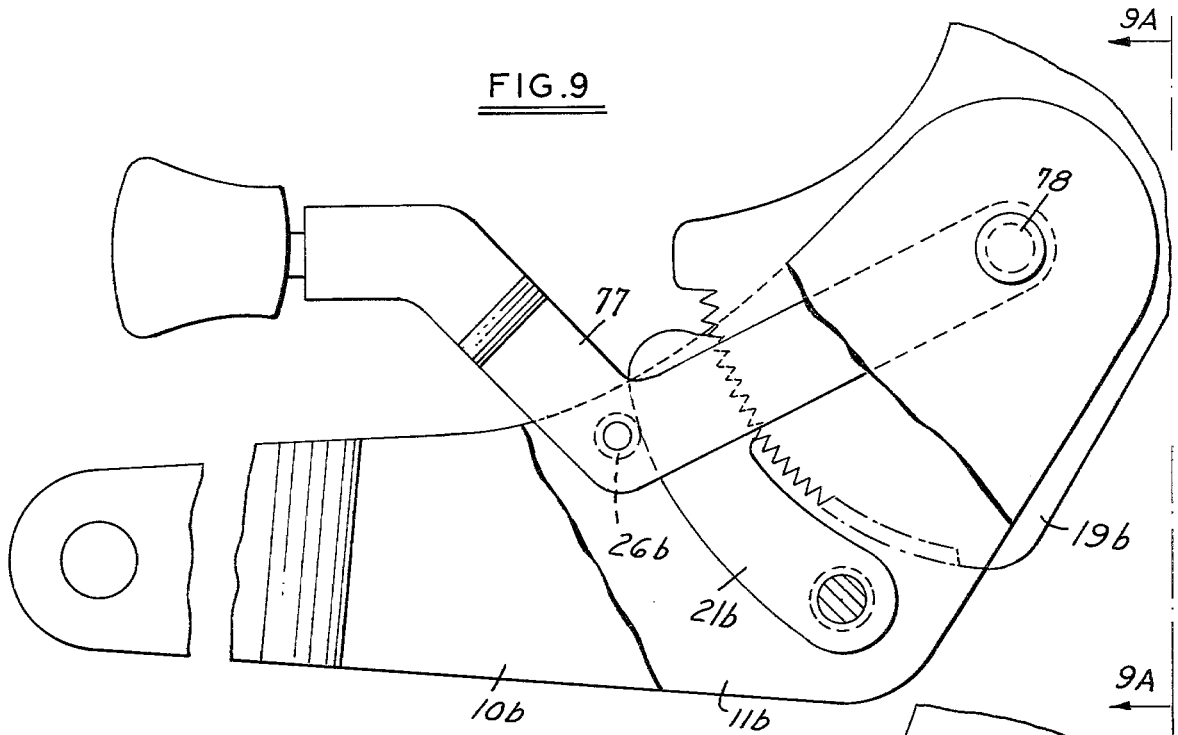
Figure 9A:
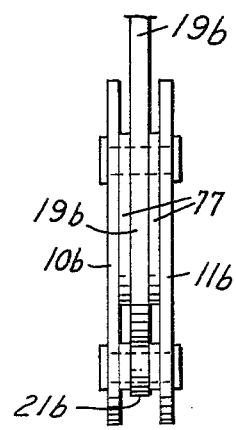

With reference to FIGS. 9 and 9A a toothed pawl 21b similar to that shown in FIGS. 1 and 4 is actuated by a roller 26b pivotally mounted between spaced handle sides 77 the ends of which, in this case, are pivotally connected at 78 to the main pivot for the seat back hinge and quadrant 19b connected to spaced inner and outer lower brackets 10b and 11b. With this modification it is seen that no relative movement other than pivotal movement is required between the handle elements 77 and brackets 10b, 11b such as provided at 34a and 34b in the first embodiment (see FIG. 2) and no slot is required in the quadrant 19b to achieve the desired clamping action between the pawl and quadrant.

Figure 10:
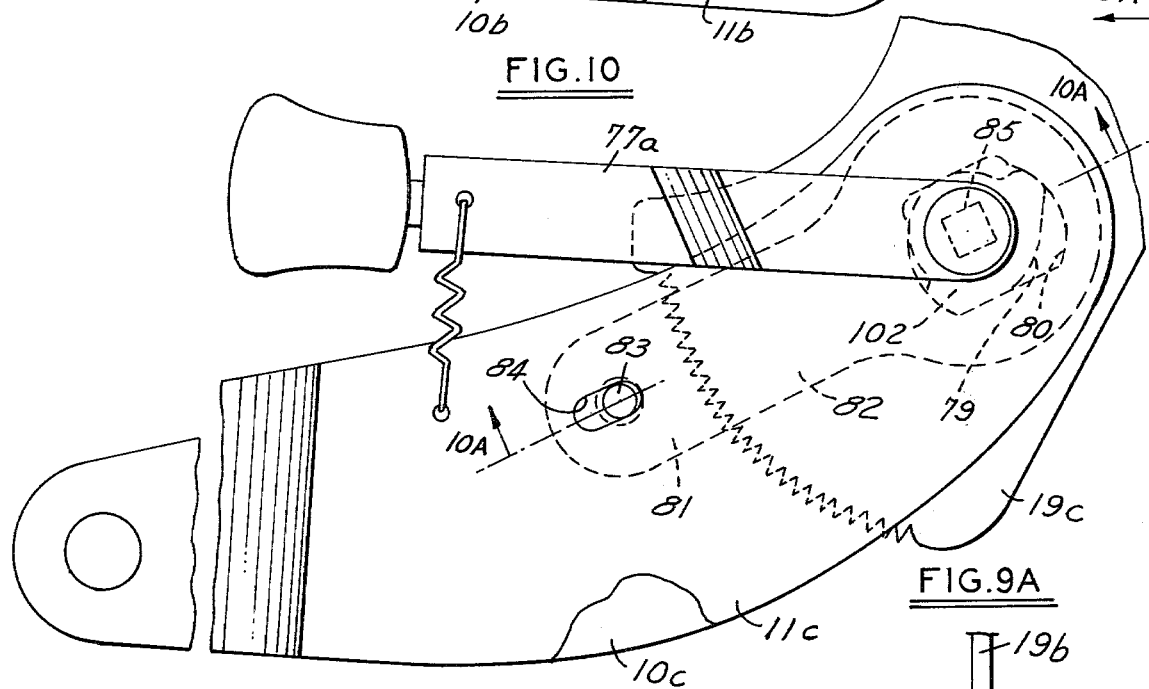
Figure 10A:
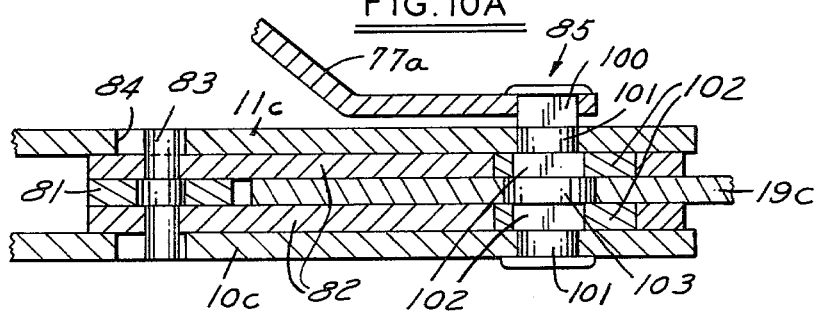

With reference to FIGS. 10 and 10a a single side handle 77a rotates pin 85 and a pair of spaced cams 79 having lobes engaging cam surfaces 80 adapted to actuate a toothed slide 81 into and out of engagement with the teeth of quadrant 19c through a pair of side links 82 connected thereto by pin 83 having extensions engaging slots 84 formed in side brackets 10c and 11c.

With reference to FIG. 10a the pin 85 operates as a pivot for the quadrant 19c and seat brackets 10c and 11c with a flatted end extension 100 for actuating engagement by handle 77a, a pair of cylindrical bearing surfaces 101 for pivotal engagement with the side links 82, a pair of square portions 102 for driving engagement with the cam elements 79, and a central cylindrical portion 103 for pivotal connection with the quadrant 19c. Thus, upon counterclockwise rotation of the handle 77a as shown in FIG. 10, the cam elements 79 provide locking engagement of the teeth while clockwise rotation of the handle 77a produces an unlocking shift of the side links 82 to release the teeth for adjustment of the quadrant 19c. In this case as in the embodiment of FIGS. 9 and 9a, the quadrant 19c and 19b may be constructed as an integral part of the upper seat back bracket for four door passenger cars, or may be separated from such bracket for relative pivotal movement as in the case of the first embodiment for forward seat back movement in the case of two door cars with rear seats, in which case the pivot pin 85 can be modified to provide a seat back bracket pivotal connection.

It will be seen that all modifications disclosed herein have in common a means of clamping an arcuate toothed sector of an adjustable quadrant with concentric surfaces of the sector having fine teeth formed in at least one of such surfaces and with some form of toothed pawl actuated by handle movement so that both tooth actuating and reacting elements are mounted on a common link to clamp the respective concentric surfaces of the toothed sector.

What is claimed is:

1. A hinge fitting for vehicle seats having a tiltable backrest member comprising a first hinge member connectable to a seat rest member, a second hinge member connectable to a backrest member, pivot means connecting said hinge members for relative pivoting movement, an adjustment quadrant for regulating the operative position of said second hinge member relative to said first having a toothed sector centered on said pivot means provided with fine pitch teeth, toothed pawl means and integral dual side tension linkage mounted on said first hinge member on either side of said pawl and toothed sector and in relatively movalbe compressively clamping and release relationship with said pawl and toothed sector, and manual means for effecting said clamping and release relationships.

2. A hinge fitting as set forth in claim 1 wherein said manual means comprises pivoted hand lever means adapted to actutate said toothed pawl means and tension linkage into clamping engagement with said pawl and toothed sector.

3. A hinge fitting as set forth in claim 1 wherein said manual means comprises pivoted hand lever means adapted to actuate said toothed pawl means and tension linkage into clamping engagement with said pawl and toothed sector, a portion of said hand lever means forming a tension element spanning said pawl means and toothed sector during clamping engagement.

4. A hinge fitting as set forth in claim 1 wherein said tension linkage includes a pivotal connection for said hand lever means on said first hinge member and wherein pawl actuating means is mounted on said hand lever means in spaced relation to said tension linkage.

5. A hinge fitting as set forth in claim 4 including an arcuate surface on the back of said pawl means and roller means mounted on said hand lever means for actuating engagement with said arcuate surface upon pivotal movement of said hand lever means.

6. A hinge fitting as set forth in claim 4 including slot and pin connecting means between said pawl and hand lever means adapted to actuate said pawl into and out of locking engagement upon pivotal movement of said hand lever means.

7. A hinge fitting as set forth in claim 5 including a side link connected to said hand lever means at both said tension linkage and roller mounting locations to provide with said hand lever a pair of tension links on either side of said pawl and toothed sector.

8. A hinge fitting as set forth in claim 1 including means adapted to positively drive said pawl out of engagement in response to opening movement of said hand lever means.

9. A hinge fitting as set forth in claim 1 including a pivotally mounted toothed element on said pawl adapted to engage said toothed sector.

10. A hinge fitting as set forth in claim 1 wherein said tension linkage connects with said pivot means.

11. A hinge fitting as set forth in claim 10 including hand lever means pivotally connected to said pivot means adapted upon arcuate movement to effect said clamping and release realationships.

12. A hinge fitting as set forth in claim 11 including a cam surface on said toothed pawl means and pawl actuating means on said pivoted hand lever means for engaging said cam surface.

13. A hinge fitting as set forth in claim 11 including eccentric means centered on said pivot means actuated by said hand lever means, said tension link means being actuated by said cam means for effecting clamping and release relationships of said toothed pawl and sector means.

14. A hinge fitting as set forth in claim 11 including toothed pawl means formed as a pair of side links with an intermediate toothed element reciprocable into and out of engagement with said toothed sector, cam means centered on said pivot means adapted to reciprocate said pawl means into and out of engagement in response to rotation of said pivot means, guide means in said first hinge member for securing said pawl means against lateral movement, and hand lever means adapted to rotate said pivot means.

15. A hinge fitting as set forth in claim 1 including a pivotal connection between said second hinge member and said adjustment quadrant, inertia latch means between said second hinge member and said adjustment quadrant normally accommodating forward tilting movement of sad second hinge member and associated seat brackets, interacting stop means respectively mounted on said hand lever means and second hinge member limiting forward tilting of said said second hinge member and preventing release actuation of said hand lever means while said seat backrest is in a forward tilted position.

16. A hinge fitting as set forth in claim 15, wherein said inertia latch means includes resilient means normally biasing said inertia latch means toward a latching engagement position when the seatback is in any adjusted position for passenger occupancy, a mounting for said resilient means adapted to release said biasing force upon initial forward tilting of said second hinge member to permit normal gravity release or emergency inertia latching engagement upon sudden vehicle deceleration.

17. A hinge fitting for vehicle seats having a tiltable backrest member comprising a first hinge member connectable to a seat rest member, a second hinge member connectable to a backrest member, pivot means connecting said hinge members for relative pivoting movement, an adjustment quadrant centered on said pivot means for regulating the operative position of said second hinge member relative to said first, toothed means including equally spaced surfaces at least one of which is provided with fine pitch teeth for actuating said adjustment quadrant, toothed pawl means and integral dual side tension linkage mounted on said first hinge member on either side of said pawl and toothed means in relatively movable compressively clamping and release relationship with said pawl and equally spaced surfaces, and manual means for effecting said clamping and release relationships.

18. A hinge fitting as set forth in claim 17 wherein said manual means comprises pivoted hand lever means adapted to actuate said toothed pawl means and reaction means into clamping engagement with said equally spaced surfaces.

19. A hinge fitting as set forth in claim 17 wherein said manual means comprises pivoted hand lever means adapted to actuate said toothed pawl means and reaction means into clamping engagement with said equally spaced surfaces, a portion of said hand lever means forming a tension element spanning said pawl means and equally spaced surfaces of said toothed means during clamping engagement.

20. A hinge fitting as set forth in claim 17 wherein said reaction element includes a pivotal connection for said hand lever means on said first hinge member and wherein pawl actuating means is mounted on said hand lever means in spaced relation to said reaction element.

21. A hinge fitting as set forth in claim 20 including an arcuate surface on said pawl means and roller means mounted on said hand lever means for actuating engagement with said arcuate surface upon pivotal movement of said hand lever means.

22. A hinge fitting as set forth in claim 20 including slot and pin connecting means between said pawl and hand lever means adapted to actuate said pawl into and out of locking engagement upon pivotal movement of said hand lever means.

23. A hinge fitting as set forth in claim 21 including a side link connected to said hand lever means at both said reaction means and roller mounting locations to provide with said hand lever a pair of tension links on either side of said pawl and toothed means.

24. A hinge fitting as set forth in claim 23 including means adapted to positively drive said pawl out of engagement in response to opening movement of said hand lever means.

25. A hinge fitting as set forth in claim 17 including a pivotally mounted toothed element on said pawl adapted to engage said toothed surface.

* * * * *

UNITED STATES PATENT AND TRADEMARK OFFICE
CERTIFICATE OF CORRECTION

PATENT NO. : 4,295,682
DATED : October 20, 1981
INVENTOR(S) : Bernd A. Kluting and Vikram H. Zaverni It is certified that error appears in the above-identified patent and that said Letters Patent are hereby corrected as shown below:

Col. 6, (claim 11) line 43, change "to" to --on--

Col. 7, (claim 15) line 3, change "sad" to --said--

Col. 7, (claim 15) line 4, change "brackets" to --backrest--.

Signed and Sealed this

Second Day of March 1982

[SEAL]

Attest:

Attesting Officer

GERALD J. MOSSINGHOFF

Commissioner of Patents and Trademarks